United States Patent
Li et al.

(10) Patent No.: US 11,355,742 B2
(45) Date of Patent: Jun. 7, 2022

(54) NEGATIVE ELECTRODE PLATE AND LITHIUM-ION SECONDARY BATTERY

(71) Applicant: Contemporary Amperex Technology Co., Limited, Ningde (CN)

(72) Inventors: Zhiqiang Li, Ningde (CN); Changlong Han, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 123 days.

(21) Appl. No.: 16/679,168

(22) Filed: Nov. 9, 2019

(65) Prior Publication Data

US 2020/0152964 A1 May 14, 2020

(30) Foreign Application Priority Data

Nov. 12, 2018 (CN) .......................... 201811337700.4

(51) Int. Cl.
| | |
|---|---|
| *H01M 4/133* | (2010.01) |
| *H01M 4/505* | (2010.01) |
| *H01M 4/525* | (2010.01) |
| *H01M 4/587* | (2010.01) |
| *H01M 10/0525* | (2010.01) |
| *H01M 10/0567* | (2010.01) |
| *H01M 4/02* | (2006.01) |

(52) U.S. Cl.
CPC ........... *H01M 4/133* (2013.01); *H01M 4/505* (2013.01); *H01M 4/525* (2013.01); *H01M 4/587* (2013.01); *H01M 10/0525* (2013.01); *H01M 10/0567* (2013.01); *H01M 2004/021* (2013.01); *H01M 2300/0025* (2013.01)

(58) Field of Classification Search
CPC ...... H01M 4/133; H01M 4/505; H01M 4/525; H01M 4/587; H01M 10/0525; H01M 10/0567; H01M 2004/021; H01M 2300/0025
See application file for complete search history.

(56) References Cited

U.S. PATENT DOCUMENTS

| | | | |
|---|---|---|---|
| 2015/0162583 A1 | 6/2015 | Dadheech et al. | |
| 2015/0303463 A1* | 10/2015 | Sasaki | H01M 4/386 429/212 |
| 2016/0285100 A1* | 9/2016 | Tanizaki | H01M 10/0525 |
| 2017/0162906 A1 | 6/2017 | Nakazawa et al. | |

FOREIGN PATENT DOCUMENTS

| | | |
|---|---|---|
| CN | 102637859 A | 8/2012 |
| CN | 102576904 B | 7/2015 |
| CN | 104781953 A | 7/2015 |
| CN | 105210225 A | 12/2015 |
| CN | 105470512 | * 4/2016 |
| CN | 105470512 A | 4/2016 |
| CN | 106025177 A | 10/2016 |
| CN | 103403944 B | 11/2016 |
| CN | 107195967 A | 9/2017 |
| CN | 107425174 A | 12/2017 |
| CN | 107681198 A | 2/2018 |
| CN | 110265625 A | 9/2019 |
| JP | 2008010316 A | 1/2008 |
| JP | 2008010316 | * 11/2008 |
| JP | 2011086617 A | 4/2011 |
| JP | 2018078029 A | 5/2018 |
| KR | 20140099987 A | 8/2014 |

OTHER PUBLICATIONS

The Decision to grant a Patent issued by SIPO for Application No. 201811337700, (Chinese counterpart of the instant Application) dated Nov. 4, 2020 (Year: 2020).*
Extended European Search Report for European Application No. 19208525.6, dated Mar. 19, 2020, 7 pages.
International Search Report for PCT application No. PCT/CN2019/116601, dated Feb. 11, 2020, 10 pages.
First Office Action for Chinese application No. 201811337700.4, dated Aug. 4, 2020, 7 pages.
First Office Action for European Application No. 19208525.6, daled Oct. 13, 2020, 7 pages.
Notice of Allowance for Chinese application No. 201811337700.4, Nov. 4, 2020, 6 pages.
The Second Office Action for European Application No. 19208525.6, dated Apr. 29, 2021, 6 pages.

* cited by examiner

*Primary Examiner* — Alexander Usyatinsky
(74) *Attorney, Agent, or Firm* — Law Offices of Liaoteng Wang

(57) ABSTRACT

This application discloses a negative electrode plate and a lithium-ion secondary battery, wherein the negative electrode plate includes a negative electrode current collector and a negative active material layer disposed on at least one surface of the negative electrode current collector, and wherein the negative active material layer includes a graphite material; wherein a ratio r between diffraction peak intensity of (004) crystal surface and diffraction peak intensity of (110) crystal surface of the negative electrode plate, a porosity s of the negative electrode plate, and a resistivity t of the negative electrode plate satisfy:

$$0.05 \leq \frac{100 \times s}{r \times t} \leq 10.$$

The negative electrode plate and the lithium-ion secondary battery provided by this application can simultaneously achieve high safety performance, cycle performance and rate performance.

11 Claims, No Drawings

NEGATIVE ELECTRODE PLATE AND LITHIUM-ION SECONDARY BATTERY

CROSS-REFERENCE TO RELATED APPLICATION

This application is based on and claims priority to Chinese Patent Application No. 201811337700.4 filed on Nov. 12, 2018, which is incorporated herein by reference in its entirety.

TECHNICAL FIELD

The present application relates to the technical field of batteries, in particular to a negative electrode plate and a lithium-ion secondary battery.

BACKGROUND

Lithium-ion secondary battery can provide stable voltage and current, has a high voltage platform, high energy density and wide temperature range, has no memory effect, and is environmentally friendly and portable, occupying the core position of the power battery.

When a lithium-ion secondary battery uses a manganese-containing positive active material, since the manganese in the positive electrode is prone to disproportionation, the generated manganese ions are dissolved in the electrolyte, migrated and deposited on the negative electrode, and then the manganese ions are ion-exchanged with lithium in the negative electrode, occupying the lithium-intercalation position of the negative electrode. In addition, the ion-exchanged lithium will no longer participate in the electrochemical reaction, causing irreversible capacity loss and deteriorating the cycle performance of the lithium-ion secondary battery.

SUMMARY

The embodiment of this application provides a negative electrode plate and a lithium-ion secondary battery, and aims to solve the technical problem that the manganese dissolution of positive electrode will deteriorate the cycle performance of the lithium-ion secondary battery.

A first aspect of this application provides a negative electrode plate comprising a negative electrode current collector and a negative active material layer disposed on at least one surface of the negative electrode current collector, wherein the negative active material layer comprises a graphite material;

wherein a ratio r between diffraction peak intensity of (004) crystal surface and diffraction peak intensity of (110) crystal surface of the negative electrode plate, a porosity s of the negative electrode plate, and a resistivity t of the negative electrode plate satisfy Formula (1):

$$0.05 \leq \frac{100 \times s}{r \times t} \leq 10, \quad \text{Formula (1)}$$

in Formula (1), the unit of t is $\Omega \cdot m$.

A second aspect of this application provides a lithium-ion secondary battery comprising a positive electrode plate, a negative electrode plate according to the first aspect of this application, a separator, and an electrolyte, wherein the positive electrode plate comprises a manganese-containing positive active material.

In the negative electrode plate provided by the embodiment of this application, the negative active material comprises a graphite material, and the ratio r between diffraction peak intensity of (004) crystal surface and diffraction peak intensity of (110) crystal surface of the negative electrode plate, the porosity s of the negative electrode plate, and the resistivity t of the negative electrode plate satisfy the above Formula (1), so that the negative electrode plate can block manganese in the electrolyte outside the negative active material layer, effectively preventing manganese from entering the inside of the negative active material layer, and reducing the deposition of manganese on the negative electrode, thus effectively suppressing the destruction of the negative electrode caused by manganese, improving the stability of the negative electrode, reducing the capacity loss of the negative electrode during the cycle, and further increasing the capacity retention rate of the lithium-ion secondary battery during the cycle, so that the lithium-ion secondary battery has high cycle performance. At the same time, since the negative electrode plate satisfies the above Formula (1), it can also ensure that the negative active material layer has high kinetic performance of delithiation and lithiation, so that the lithium-ion secondary battery has a higher rate performance at the same time.

DETAILED DESCRIPTION

In order to make the objects, technical solutions, and beneficial effects of the present application more clear, the present application will be further described in detail below with reference to the embodiments. It is to be understood that the embodiments described herein are merely illustrative of the application and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any arbitrary upper limit may be combined with any other upper limit to form an unspecified range. Further, although not explicitly stated, each point or single value between the endpoints of the range is included in the range. Thus, each point or single value can be combined with any other point or single value or combined with other lower or upper limits to form a range that is not explicitly recited.

In the description of the present specification, it is to be noted that "above" and "below" are inclusive of the number itself, and "more" in "one or more" means two or more.

The above summary of the present application is not intended to describe each disclosed embodiment or every implementation. The following description more particularly exemplifies the exemplary embodiments. In many places throughout the application, guidance is provided through a series of embodiments that can be used in various combinations. In each instance, the list is merely representative and should not be construed as exhaustive.

Negative Electrode Plate

A first aspect of the present application provides a negative electrode plate. The negative electrode plate comprises a negative electrode current collector and a negative active material layer disposed on at least one surface of the negative electrode current collector. For example, the negative current collector includes two opposite surfaces in the thickness direction thereof, and the negative active material layer is disposed on either or both of the surfaces of the negative electrode current collector.

The negative active material layer contains a negative active material, which can perform reversible deintercalation/intercalation of lithium ions during operation to ensure normal proceeding of the electrochemical process.

Further, the negative active material comprises a graphite material; and the ratio r between diffraction peak intensity of (004) crystal surface and diffraction peak intensity of (110) crystal surface of the negative electrode plate, the porosity s of the negative electrode plate, and the resistivity t of the negative electrode plate satisfy Formula (1):

$$0.05 \le \frac{100 \times s}{r \times t} \le 10. \quad \text{Formula (1)}$$

In Formula (1), the unit of t is $\Omega \cdot m$.

Herein, the ratio r between diffraction peak intensity of (004) crystal surface and diffraction peak intensity of (110) crystal surface of the negative electrode plate, the porosity s of the negative electrode plate are all well-known in the art.

The ratio r between diffraction peak intensity of (004) crystal surface and diffraction peak intensity of (110) crystal surface of the negative electrode plate, i.e., the orientation index (OI for short) of the negative electrode plate, indicates the anisotropy degree of crystal distribution in the negative active material layer. An X-ray diffraction spectrum can be obtained by using an X-ray powder diffractometer (X'pert PRO) according to the general rule of X-ray diffraction analysis and determination method of graphite lattice parameter JIS K 0131-1996 and JB/T4220-2011. Then the ratio r between diffraction peak intensity of (004) crystal surface and diffraction peak intensity of (110) crystal surface of the negative electrode plate is calculated as follows: r=C004/C110, wherein C004 is the intensity of the diffraction peak intensity of (004) crystal surface, and C110 is the diffraction peak intensity of (110) crystal surface.

The porosity s of the negative electrode plate indicates the percentage of the pore volume in the negative electrode plate to the total volume of the negative electrode plate. The porosity of the negative electrode plate can be tested by a porosity meter. As an example, a negative electrode plate sample of a certain mass is weighed; the thickness of the sample is measured by using a tenthousandth micrometer; and the apparent volume $V_1$ of the sample is obtained according to the surface area and thickness of the sample; then place the sample on the AccuPyc II Model 1340 Automatic True Density Tester; close the test system; and introduce nitrogen gas into the system according to the program, and measure the gas pressure in the sample chamber and expansion chamber, according to Boyle's Law (PV=C, where P is the pressure of the gas, V is the volume of the gas, and C is a constant), calculate the true volume $V_2$, and then the porosity s of the negative electrode plate is obtained from the formula $s=(V_1-V_2)/V_1 \times 100\%$.

The resistivity t of the negative electrode plate indicates the resistance characteristics of the negative electrode plate. The resistance R of the negative electrode plate can be obtained by an internal resistance tester, and the resistivity t of the negative electrode plate is calculated according to the formula $t=R \cdot p/h$, where p is the contact area between the negative electrode plate and the conductive terminal of the internal resistance tester, for example, $p=49\pi$ mm$^2$, and h is the thickness of the negative electrode plate. As an example, using the (HIOKI) BT3562 Internal Resistance Tester, the upper and lower sides of the negative electrode plate are clamped between the two conductive terminals of the internal resistance tester, and a certain pressure is applied, then the resistance R of the negative electrode is measured, where the diameter of the conductive terminal is 14 mm, that is to say, the contact area is $p=49\pi$ mm$^2$, and the applied pressure is 15 MPa~27 MPa, and the test time is from 5 s to 17 s.

Herein, the calculation of Formula (1) involves only the calculation of the numerical value. For example, the ratio r between diffraction peak intensity of (004) crystal surface and diffraction peak intensity of (110) crystal surface of the negative electrode plate is 50, and the porosity s of the negative electrode plate is 25%, and the resistivity t of the negative electrode plate is 10 $\Omega \cdot m$, then $$\frac{100 \times s}{r \times t} = \frac{100 \times 25\%}{50 \times 10} = 0.05.$$

In the negative electrode plate provided by the embodiment of the present application, the negative active material comprises a graphite material, and the ratio r between diffraction peak intensity of (004) crystal surface and diffraction peak intensity of (110) crystal surface of the negative electrode plate, the porosity s of the negative electrode plate, and the resistivity t of the negative electrode plate satisfy the above Formula (1), so that the negative electrode plate can block manganese in the electrolyte outside the negative active material layer, effectively preventing manganese from entering the inside of the negative active material layer, and reducing the deposition of manganese on the negative electrode, thus effectively suppressing the destruction of the negative electrode caused by manganese, improving the stability of the negative electrode, ensuring that the negative active material layer maintains good channels for delithiation/lithiation during the cycle, reducing the capacity loss of the negative electrode during the cycle, and thus increasing the capacity retention rate of the lithium-ion secondary battery, so that the lithium-ion secondary battery has a higher cycle performance. At the same time, since the negative electrode plate satisfies the above Formula (1), it can also ensure that the negative active material layer has high kinetic performance of delithiation and lithiation, so that the lithium-ion secondary battery has a higher rate performance.

Preferably, the ratio r between diffraction peak intensity of (004) crystal surface and diffraction peak intensity of (110) crystal surface of the negative electrode plate is from 1 to 50, which further reduces the deposition of manganese on the negative electrode, and ensures that the negative active material layer have high kinetic performance of delithiation and lithiation at the same time.

Preferably, the porosity s of the negative electrode plate is from 10% to 60%, which further reduces the deposition of manganese on the negative electrode, and ensures that the negative active material layer have high kinetic performance of delithiation and lithiation at the same time.

Further, the compact density of the negative active material layer is preferably from 1.5 g/cm$^3$ to 1.75 g/cm$^3$. When using the negative active material layer having a compact density of 1.5 g/cm$^3$ to 1.75 g/cm$^3$, the diffusion rate of manganese ions in the negative active material layer is low, thereby further reducing the ion exchange between the manganese ions and the lithium in the negative electrode, and suppressing the destruction of the negative electrode caused by manganese, improving the stability of the negative electrode.

Preferably, the resistivity t of the negative electrode plate is from 5 Ω·m to 100 Ω·m, which further reduces the deposition of manganese on the negative electrode, ensures the above effect of the negative electrode plate, and makes the negative electrode plate have a lower resistivity at the same time. It is beneficial to reduce the overall impedance of the lithium-ion secondary battery, so that the lithium-ion secondary battery has both high kinetic performance and rate performance.

The negative electrode plate according to the embodiment of the present application focuses on the reasonable matching of the ratio r between diffraction peak intensity of (004) crystal surface and diffraction peak intensity of (110) crystal surface of the negative electrode plate, the porosity s of the negative electrode plate, and the resistivity t of the negative electrode plate, so that they satisfy the above Formula (1), thereby achieving the above-described technical effects.

In the negative electrode plate according to the embodiment of the present application, the graphite material in the negative active material may be one or both of artificial graphite and natural graphite.

Further, the negative active material may comprise one or more of Mesocarbon microbeads (MCMB), hard carbon, soft carbon, silicon, silicon-carbon composite, SiO, Li—Sn alloy, Li—Sn—O alloy, Sn, SnO, $SnO_2$, spinel lithium titanate $Li_4Ti_5O_{12}$, Li—Al alloy, and metal lithium.

Further, the mass percentage of the graphite material in the negative active material is 50 wt % or more, and the lower limit of the mass percentage of the graphite material in the negative active material is, for example, 50 wt %, 55 wt %, 60 wt %, 65 wt %. 70 wt %, 75 wt %, 80 wt %, 85 wt %, 90 wt %, or 95 wt %.

In addition, the negative active material layer may further comprise a conductive agent and a binder. The type of the conductive agent and the binder in the negative active material layer of the present application is not particularly limited, and can be selected according to actual needs. As an example, the conductive agent may be one or more of graphite, superconducting carbon, acetylene black, carbon black, ketjen black, carbon dots, carbon nanotubes, graphene, and carbon nanofibers; the binder may be one or more of styrene butadiene rubber (SBR), polyvinylidene fluoride (PVDF), polytetrafluoroethylene (PTFE), polyvinyl butyral (PVB), water-dispersible acrylic resin and carboxymethyl cellulose (CMC).

The negative active material layer may also optionally comprise a thicker such as carboxymethyl cellulose (CMC).

The negative electrode current collector collects and conducts current. The negative electrode current collector may be a material such as a metal foil or a porous metal plate, for example, a foil or a porous plate of a metal such as copper, nickel, titanium or iron or an alloy thereof, such as a copper foil.

The negative electrode plate can be prepared according to a conventional method in the art. Usually, the negative active material and optional conductive agent, binder and thickener are dispersed in a solvent to form a uniform negative electrode slurry, and the solvent may be N-methylpyrrolidone (NMP) or deionized water. Then the negative electrode slurry is applied on the negative electrode current collector, and after drying, cold pressing and the like, a negative electrode plate is obtained.

Lithium-Ion Secondary Battery

A second aspect of the present application provides a lithium-ion secondary battery, comprising a positive electrode plate, a negative electrode plate according to the first aspect of the present application, a separator, and an electrolyte.

Since the negative electrode plate according to the first aspect of the present application is used, the lithium-ion secondary battery according to the embodiment of the present application has high cycle performance and high rate performance at the same time.

The positive electrode plate comprises a positive electrode current collector and a positive active material layer disposed on at least one surface of the positive electrode current collector. For example, the positive electrode current collector includes two opposite surfaces in the thickness direction thereof, and the positive active material layer is disposed on either or both of the surfaces of the positive electrode current collector.

The positive active material layer contains a positive active material, which can perform reversible deintercalation/intercalation of lithium ions during operation. The positive active material is preferably a manganese-containing positive active material such as $LiMn_2O_4$ or $LiNi_mCo_nMn_{1-m-n}O_2$ (0<m<1, 0≤n<1, 0<m+n<1). The manganese-containing positive active material has high structural stability, and its oxidation activity to the electrolyte is low, which can reduce the side reaction of the electrolyte on the surface of the positive active material, inhibit gas production, reduce heat generation, and thereby reduce the risk of out of control for the lithium-ion secondary, making the lithium-ion secondary battery have higher safety performance.

Preferably, the positive active material includes a first positive active material and a second positive active material, wherein the first positive active material is a compound represented by the chemical formula (1), $$Li_{1+x}Ni_aCo_bM_{1-a-b}O_{2-y}A_y \qquad \text{chemical formula (1).}$$

In the chemical formula (1), −0.1≤x≤0.2, 0<a<1, 0≤b<1, 0<a+b<1, 0≤y<0.2, M comprises one or more of Mn, Fe, Cr, Ti, Zn, V, Al, Zr and Ce, and A comprises one or more of S, N, F, Cl, Br and I.

The second positive active material is a compound represented by the chemical formula (2), $$Li_{1+z}Mn_cM'_{2-c}O_{4-d}A'_d \qquad \text{chemical formula (2).}$$

In the chemical formula (2), −0.1≤z≤0.2, 0<c≤2, 0≤d<1, M' comprises one or more Ni, Fe, Cr, Ti, Zn, V, Al, Mg, Zr, and Ce, and A' comprises one or more of S, N, F, Cl, Br, and I.

The positive active material includes a first positive active material and a second positive active material; such positive active material has a high voltage platform, energy density, and high structural stability, and can withstand more severe structural destructive force, and no oxygen release occurs, which effectively reduces the thermal runaway caused by structural damage of the material. In addition, such positive active material has low oxidation activity to the electrolyte, can reduce the side reaction of the electrolyte on the surface of the positive active material, inhibit gas production, and reduce heat production. Thereby, the safety performance of the lithium-ion secondary battery is effectively improved. The use of the positive active material can also reduce the polarization of the positive electrode, reduce the capacity loss due to polarization, and in particular, reduce the dissolution rate of manganese ions from the positive active material, thereby increasing the capacity retention rate of the lithium-ion secondary battery during the cycle, making the lithium-ion secondary battery have high cycle performance.

That is to say, the positive active material including the first positive active material and the second positive active material is used in combination with the negative electrode plate according to the first aspect of the present application, so that the lithium-ion secondary battery has a higher voltage platform and energy density, at the same time also combines the high safety performance, cycle performance and rate performance.

Further preferably, in the chemical formula (1), $0.5 \leq a<1$, $0<b<0.5$, $0.7 \leq a+b<1$, $0 \leq y<0.1$, M is one or both of Mn and Al, and A is one or both of S or F. Thus the energy density of the lithium-ion secondary battery is further improved.

Further, the mass ratio of the first positive active material to the second positive active material in the positive active material is from 3:7 to 99.5:0.5, preferably from 35:65 to 95:5.

The compact density of the positive active material layer is preferably from 3.1 g/cm$^3$ to 3.65 g/cm$^3$, so that the porosity of the positive active material layer is low under the condition that the thickness of the positive electrode plate is constant, which is favorable for reducing the dissolution rate of Mn from the positive active material, thereby improving the cycle performance of the battery. The positive active material layer also allows the battery to have a high reversible capacity.

A conductive agent and a binder may also be included in the positive active material layer. The present application does not specifically limit the types of the conductive agent and the binder in the positive active material layer, and can be selected according to actual needs. As an example, the conductive agent may be one or more of graphite, superconducting carbon, acetylene black, carbon black, ketjen black, carbon dots, carbon nanotubes, graphene, and carbon nanofibers; and the binder may be one or more of styrene butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA) and polyvinyl alcohol (PVA).

In some optional embodiments, the mass ratio of the conductive agent to the positive active material in the positive active material layer is 1.5:95.5 or more, and the weight percentage of the binder in the positive active material layer is 2 wt % or less. When the content of the conductive agent and the binder in the positive active material layer is within a predetermined range, it is advantageous to sufficiently coat the positive active material with the conductive agent to form a uniform and rapid electron transport network, thereby improving the rate performance and cycle performance of the lithium-ion secondary battery.

The positive current collector collects and conducts current. The positive electrode current collector may be a metal foil or a porous metal plate, for example, a foil or a porous plate of a metal such as aluminum, copper, nickel, titanium or silver or an alloy thereof, such as an aluminum foil.

The positive electrode plate can be prepared by coating method. For example, the positive active material, the binder, the conductive agent, and the organic solvent are first mixed in a predetermined ratio, wherein the organic solvent may be N-methylpyrrolidone (NMP), and the mixture is stirred to a uniform system to obtain a positive electrode slurry; then the slurry is applied onto the positive electrode current collector, and after drying, rolling, and the like, a positive electrode plate is obtained.

The electrolyte comprises a lithium salt and a solvent to transport lithium ions between the positive and negative electrodes of the battery.

As some examples, the lithium salt in the electrolyte is one or more selected from the group consisting of LiPF$_6$ (lithium hexafluorophosphate), LiBF$_4$ (lithium tetrafluoroborate), LiClO$_4$ (lithium perchlorate), LiAsF$_6$ (lithium hexafluoroarsenate), LiFSI (lithium bis(fluorosulfonyl)imide), LiTFSI (lithium bis(trifluoromethanesulphonyl)imide), LiTFS (lithium trifluoromethanesulfonate), LiDFOB (lithium difluoro(oxalato)borate), LiBOB (lithium bis(oxalate)borate), LiPO$_2$F$_2$ (lithium difluorophosphate), LiDFOP (lithium difluorodioxalate phosphate and LiDFOP (lithium difluoro(oxalato)phosphate), preferably one or more of LiPF$_6$ (lithium hexafluorophosphate), LiBF$_4$ (lithium tetrafluoroborate), LiBOB (lithium bis(oxalate)borate), LiDFOB (lithium difluoro(oxalato)phosphate), LiTFSI (lithium bis(trifluoromethanesulphonyl)imide), and LiFSI (lithium bis(fluorosulfonyl)imide).

As some examples, the solvent in the electrolyte is a non-aqueous organic solvent, such as one or more of ethylene carbonate (EC), propylene carbonate (PC), ethyl methyl carbonate (EMC), diethyl carbonate (DEC), dimethyl carbonate. (DMC), dipropyl carbonate (DPC), methyl propyl carbonate (MPC), ethyl propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB), and ethyl butyrate (EB), and two or more thereof in combination are preferable.

Further, the electrolyte contains a manganese ion complexing additive, and the manganese ion complexing additive is preferably a chain nitrile compound. Manganese-ion complexing additive, especially the chain nitrile manganese ion complexing additive, can passivate manganese in the positive active material, effectively reducing the dissolution of manganese ions, reducing the structural damage of the positive active material, and reducing the deposition of manganese on the negative electrode, thus improving the cycle performance of the lithium-ion secondary battery.

Preferably, the manganese ion complexing additive is one or more of adiponitrile (ADN), succinonitrile (SN), glutaronitrile (GN), and hexane tricarbonitrile (HTN).

Further preferably, the mass percentage of the manganese ion complexing additive in the electrolyte is from 0.1 wt % to 4 wt %.

The electrolyte further contains a negative-electrode film-forming additive, and the negative-electrode film-forming additive is one or more of a cyclic carbonate containing an unsaturated bond, a fluorine-containing cyclic carbonate, a cyclic sulfonate, and a cyclic sulfate. The negative-electrode film-forming additive can form an interface film having good lithium ion transport performance and mechanical properties on the negative electrode, and strengthen the protection of the negative electrode. The interface film can also effectively prevent the above-mentioned manganese ion complexing additive from intercalating reaction in the negative electrode, prevent the damage to the negative electrode interface caused by the addition of the manganese ion complexing additive, thereby improving the stability of the negative electrode. Therefore, the inclusion of the negative-electrode film-forming additive in the electrolyte can further improve the cycle performance of the lithium-ion secondary battery.

Preferably, the negative-electrode film-forming additive is vinylene carbonate (VC), vinyl ethylene carbonate (VEC), fluoroethylene carbonate (FEC), difluoroethylene carbonate (DFEC), trifluoromethyl ethylene carbonate. (TFPC), methylene methane disulfonate (MMDS), 1,3-propane sultone (1,3-PS), 1-propene-1,3-sulfonate (PST) and ethylene sulfate (i.e. 1,3,2-dioxathiolane 2,2-dioxide, abbreviated as DTD).

Further preferably, the mass percentage of the negative-electrode film-forming additive in the electrolyte is from 0.1 wt % to 2 wt %.

Further, the electrolyte further contains a fluorine-containing lithium salt type additive. The fluorine-containing lithium salt type additive can effectively control the increase of the impedance due to the film-forming strengthening of the negative electrode interface, making the negative electrode plate have a lower impedance, so that the lithium-ion secondary battery has a lower internal resistance, thereby making the lithium-ion secondary battery have high cycle performance while combining high kinetic performance and rate performance.

Preferably, the fluorine-containing lithium salt type additive is one or more selected from the group consisting of lithium difluorophosphate $LiPO_2F_2$, lithium difluoro(oxalato)phosphate LiDFOP, lithium tetrafluoroborate $LiBF_4$, and lithium difluoro(oxalato)borate LiDFOB.

Further preferably, the mass percentage of the fluorine-containing lithium salt type additive in the electrolyte is from 0.05 wt % to 1.5 wt %.

It can be understood that lithium difluorophosphate $LiPO_2F_2$, difluoro(oxalato)phosphate LiDFOP, lithium tetrafluoroborate $LiBF_4$, and lithium difluoro(oxalato)borate LiDFOB can be used as both a lithium salt for electrolyte and a fluorine-containing lithium salt type additive, as long as it is ensured that the fluorine-containing lithium salt type additive satisfies the preset amount to ensure that the fluorine-containing lithium salt type additive can effectively control the increase of impedance due to film-forming strengthening of the negative electrode interface.

The electrolyte may optionally contain other additives such as a cyclic quaternary ammonium salt of sulfonate, tris(trimethylsilyl)phosphate (TMSP), tris(trimethylsilyl)borate (TMSB), and the like.

The separator of the lithium-ion secondary battery according to the embodiment of the present application is not particularly limited, and any well-known separator having a porous structure and having electrochemical stability and chemical stability can be used, such as a monolayer film or multilayer film of one or more of glass fiber, nonwoven fabric, polyethylene (PE), polypropylene (PP), and polyvinylidene fluoride (PVDF).

The positive electrode plate, the separator and the negative electrode plate are stacked in order, so that the separator is placed between the positive electrode plate and the negative electrode plate to take a function of isolation, thereby obtaining an electrode assembly. An electrode assembly may also be obtained after winding. The electrode assembly is placed in a package; after injection of an electrolyte, the electrolyte is sufficiently wetted in the pores of the positive active material layer, the negative active material layer and the separator, and then the package is sealed to prepare a lithium-ion secondary battery.

When the remaining capacity of the lithium-ion secondary battery of the present application is 70% or more of nominal capacity, the total content of Mn element in the negative active material layer does not exceed 1,500 ppm, wherein ppm (parts per million) is a mass percentage of the manganese element in the negative active material layer relative to the total mass of the negative active material layer. In the present application, by making the ratio r between diffraction peak intensity of (004) crystal surface and diffraction peak intensity of (110) crystal surface of the negative electrode plate, the porosity s of the negative electrode plate, and the resistivity t of the negative electrode plate satisfy the above Formula (1), it can effectively inhibit the deposition of Mn element from the positive active material on the negative active material layer during the charge and discharge cycle, so that the negative active material layer maintains good channels for delithiation/lithiation during the subsequent cycle of the battery, thereby improving the cycle performance of the battery and ensuring that the negative active material layer has high kinetic performance of delithiation/lithiation, so that the lithium-ion secondary battery has high rate performance.

EXAMPLE

The following examples are intended to describe the disclosure of the present application, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Preparation of Positive Electrode Plate

A first positive active material $LiNi_{0.8}Co_{0.1}Mn_{0.1}O_2$, a second positive active material $LiMn_2O_4$, a conductive agent carbon black and a binder PVDF were dispersed in an organic solvent NMP and uniformly mixed to obtain a positive electrode slurry; then the positive electrode slurry was coated on a positive electrode current collector aluminum foil, and after drying, cold pressing, slitting and cutting, a positive electrode plate was obtained, wherein the mass ratio of the first positive active material $LiNi_{0.8}Co_{0.1}Mn_{0.1}O_2$ to the second positive active material $LiMn_2O_4$ was 55:45 and the weight ratio of the positive active material, the conductive carbon black and the binder PVDF was 96:2:2.

Preparation of Negative Electrode Plate

A negative active material graphite and a conductive agent carbon black, a thickener CMC and a binder SBR were dispersed in a solvent deionized water at a weight ratio of 96:1:1:2 to form a uniform negative electrode slurry; then the negative electrode slurry was coated on a negative current collector copper foil, and after drying, cold pressing, slitting, and cutting, a negative electrode plate was obtained, then the OI value, the porosity, the resistivity and the compact density were tested.

Preparation of Electrolyte

Ethylene carbonate (EC), ethyl methyl carbonate (EMC) and diethyl carbonate (DEC) were uniformly mixed at a mass ratio of 30:40:30 to obtain a non-aqueous organic solvent, and then 1 mol/L of $LiPF_6$ was uniformly dissolved in such non-aqueous organic solvent, and uniformly mixed to obtain an electrolyte.

Preparation of Lithium-Ion Secondary Battery

The positive electrode plate, a separator and the negative electrode plate were stacked in order. A PP/PE/PP composite film was used as the separator. Then the stack was wound into an electrode assembly and packed in a soft casing. A soft pack battery was made after top side sealing and electrolyte injection.

Examples 2-12 and Comparative Examples 1-2

Different from Example 1, some relevant parameters of the lithium-ion secondary battery were adjusted, as shown in Table 1.

Test Section (1) High-Temperature Cycle Performance Test of Lithium-Ion Secondary Battery The lithium-ion secondary battery was allowed to stand for 5 minutes at 45° C., and charged at a constant current of 1 C to a voltage of 4.2 V, and then charged at a constant voltage until the current was 0.05 C or less, and then allowed to stand for 5 minutes, and discharged at a constant current of 1 C to 3.0 V. This was a charge/discharge cycle. The discharge capacity of at this time was the discharge capacity at the first cycle. The lithium-ion secondary battery was subjected to 400 charge/discharge cycles in accordance with the above method. Discharge capacity in each cycle was recorded.

The capacity retention ratio (%) of the lithium-ion secondary battery after 400 1 C/1 C cycles at 45° C.=discharge capacity at the $400^{th}$ cycle/discharge capacity at the first cycle×100%.

(2) DC (Direct Current) Impedance Test of Lithium-Ion Secondary Battery

The lithium-ion secondary battery was allowed to stand for 5 minutes at 25° C., and charged at a constant current of 1 C to a voltage of 4.2 V, and then charged at a constant voltage until the current was 0.05 C or less. At this time, the state of charge (SOC) of the battery was 100%. After that, the battery was allowed to stand for 5 minutes, and then discharged at a constant current of 1 C to adjust the state of charge (SOC) of the lithium-ion secondary battery to 50%.

The lithium-ion secondary battery having 50% SOC was allowed to stand for 10 minutes, and discharged at a constant current of 4 C for 30 seconds. The voltage $U_1$ at the last 1 second of standing, the voltage U2 at the last 1 second of discharging at a constant current of 4 C, and the current I of discharging at a constant current of 4 C were recorded.

The DC resistance of the lithium-ion secondary battery at 25 C, 50% SOC, 4 C rate constant current discharge for 30 s is calculated by (U2−U1)/I.

(3) Thermal Shock Test of Lithium-Ion Secondary Battery

The lithium-ion secondary battery was allowed to stand at 25° C. for 5 minutes, and charged at a constant current of 1 C to a voltage of 4.2 V, and then charged at a constant voltage until the current was 0.05 C or less, and then was allowed to stand for 5 minutes. Then, the lithium-ion secondary battery was placed in an oven, and the oven temperature was set to be raised from 25° C. to 130° C. at a heating rate of 2° C./min, and kept for 2 hours. Monitor the temperature of the battery surface during the heating process and the heat preservation process, and record the highest surface temperature of the battery.

(4) Manganese Element Content Test of the Negative Active Material Layer

The lithium-ion secondary battery with a remaining capacity of 70% of the nominal capacity was allowed to stand at 25° C. for 5 minutes, and charged at a constant current of 1 C to a voltage of 4.2 V, and then charged at a constant voltage until the current was 0.05 C or less, and then was allowed to stand for 5 minutes. The current was discharged at a constant current of 1 C to a voltage of 3.0 V.

The negative active material layer was digested by a microwave digestion apparatus. Specifically, the lithium-ion secondary battery was disassembled, the negative active material layer was scraped, and the scraped powder was placed in the digestion can and the digestion apparatus was started, and the powder was digested to obtain a digestion solution of the negative active material layer. The mass of the negative active material layer was referred to as $m_1$ (g).

The trace manganese element mass was measured by a plasma emission spectrometer PE7000DV. Specifically, a manganese element standard solution was prepared, and a manganese element standard curve was tested and plotted, and then the mass of the manganese element in the above-mentioned digestion solution of negative active material layer was measured and recorded as $m_2$ (mg).

The content of manganese element (ppm) in the negative active material layer=$m_2/m_1$.

The test results of Examples 1-12 and Comparative Examples 1-2 are shown in Table 2.

TABLE 1

| | Positive electrode plate | Negative electrode plate | | | | | Electrolyte | | |
|---|---|---|---|---|---|---|---|---|---|
| | First positive active material/ second positive active material (mass ratio) | OI value (r) | Porosity (s) | Resistivity (t)/ $\Omega \cdot m$ | Compact density/ $g \cdot cm^{-3}$ | $\frac{100 \times s}{r \times t}$ | Manganese ion complexing additive, content/ wt % | Negative-electrode film-forming additive, content/ wt % | Fluorine-containing lithium salt type additive, content/ wt % |
| Example 1 | $LiNi_{0.8}Co_{0.1}Mn_{0.1}O_2/LiMn_2O_4$ (55:45) | 50 | 25% | 10 | 1.55 | 0.05 | / | / | / |
| Example 2 | $LiNi_{0.8}Co_{0.1}Mn_{0.1}O_2/LiMn_2O_4$ (55:45) | 1 | 25% | 5 | 1.55 | 5 | / | / | / |
| Example 3 | $LiNi_{0.8}Co_{0.1}Mn_{0.1}O_2/LiMn_2O_4$ (55:45) | 1 | 50% | 5 | 1.55 | 10 | / | / | / |

TABLE 1-continued

| | Positive electrode plate | | Negative electrode plate | | | | Electrolyte | | |
|---|---|---|---|---|---|---|---|---|---|
| | First positive active material/ second positive active material (mass ratio) | OI value (r) | Porosity (s) | Resistivity (t)/ $\Omega \cdot m$ | Compact density/ $g \cdot cm^{-3}$ | $\dfrac{100 \times s}{r \times t}$ | Manganese ion complexing additive, content/ wt % | Negative-electrode film-forming additive, content/ wt % | Fluorine-containing lithium salt type additive, content/ wt % |
| Example 4 | $LiNi_{0.8}Co_{0.1}Mn_{0.1}O_2/LiMn_2O_4$ (55:45) | 20 | 30% | 6 | 1.55 | 0.25 | / | / | / |
| Example 5 | $LiNi_{0.8}Co_{0.1}Mn_{0.1}O_2/LiMn_2O_4$ (65:35) | 4 | 10% | 40 | 1.55 | 0.06 | / | / | / |
| Example 6 | $LiNi_{0.8}Co_{0.1}Mn_{0.1}O_2/LiMn_2O_4$ (80:20) | 1 | 60% | 100 | 1.55 | 0.6 | / | / | / |
| Example 7 | $LiNi_{0.5}Co_{0.2}Mn_{0.3}O_2/LiMn_2O_4$ (45:55) | 20 | 30% | 6 | 1.55 | 0.25 | / | / | / |
| Example 8 | $LiNi_{1/3}Co_{1/3}Mn_{1/3}O_2/LiMn_2O_4$ (35:65) | 20 | 30% | 6 | 1.55 | 0.25 | / | / | / |
| Example 9 | $LiNi_{0.8}Co_{0.1}Mn_{0.1}O_2/LiMn_2O_4$ (55:45) | 20 | 30% | 6 | 1.55 | 0.25 | SN 0.5 | / | / |
| Example 10 | $LiNi_{0.8}Co_{0.1}Mn_{0.1}O_2/LiMn_2O_4$ (55:45) | 20 | 30% | 6 | 1.55 | 0.25 | / | VEC 0.2 | / |
| Example 11 | $LiNi_{0.8}Co_{0.1}Mn_{0.1}O_2/LiMn_2O_4$ (55:45) | 20 | 30% | 6 | 1.55 | 0.25 | SN 0.5 | VEC 0.2 | / |
| Example 12 | $LiNi_{0.8}Co_{0.1}Mn_{0.1}O_2/LiMn_2O_4$ (55:45) | 20 | 30% | 6 | 1.55 | 0.25 | SN 0.5 | VEC 0.2 | LiDFOP 0.1 |
| Comparative Example 1 | $LiNi_{0.8}Co_{0.1}Mn_{0.1}O_2/LiMn_2O_4$ (55:45) | 55 | 15% | 10 | 1.55 | 0.03 | / | / | / |
| Comparative Example 2 | $LiNi_{0.8}Co_{0.1}Mn_{0.1}O_2/LiMn_2O_4$ (55:45) | 0.9 | 50% | 5 | 1.55 | 11.1 | / | / | / |

In Table 1, the content of the manganese ion complexing additive, the content of the negative-electrode film-forming additive, and the content of the fluorine-containing lithium salt type additive are all mass percentages in the electrolyte.

TABLE 2

| | Manganese element content of the negative active material layer/ppm | Thermal shock test - maximum surface temperature of battery/° C. | Capacity retention ratio after 400 cycles, 45° C., 1 C/1 C/% | DC impedance, 25° C., 50% SOC, 4 C rate constant current discharge for 30 s/mΩ |
|---|---|---|---|---|
| Example 1 | 746 | 184.6 | 93.3 | 22.6 |
| Example 2 | 1378 | 185.4 | 94.4 | 22.0 |
| Example 3 | 1488 | 188.9 | 93.5 | 20.2 |
| Example 4 | 895 | 187.3 | 93.8 | 19.7 |
| Example 5 | 842 | 188.7 | 94.2 | 22.8 |
| Example 6 | 712 | 189.6 | 93.1 | 23.4 |
| Example 7 | 1023 | 176.3 | 94.1 | 22.6 |
| Example 8 | 1342 | 168.7 | 94.6 | 24.1 |
| Example 9 | 786 | 186.1 | 95.8 | 22.5 |
| Example 10 | 1157 | 185.0 | 96.0 | 27.1 |
| Example 11 | 643 | 186.3 | 96.9 | 25.9 |
| Example 12 | 584 | 184.1 | 97.0 | 17.3 |
| Comparative Example 1 | 1540 | 181.4 | 85.3 | 43.2 |
| Comparative Example 2 | 1783 | 189.7 | 84.7 | 25.9 |

As can be seen from the comparison of Examples 1-12 and Comparative Examples 1-2, when the OI value r of the negative electrode plate, the porosity s of the negative electrode plate, and the resistivity t of the negative electrode plate satisfied the above formula (1), and when the lithium-ion secondary battery having a remaining capacity of 70% of the nominal capacity was charged at a constant current of 1 C to a voltage 4.2 V, and then discharged at a constant current of 1 C to a voltage of 3.0 V, the content of manganese deposited on the negative active material layer was reduced to 1500 ppm or less, the amount of the manganese deposited on the negative active material layer during charge and discharge was significantly reduced, so that the negative active material layer maintained good channels for delithiation/lithiation during the subsequent cycle of the battery, thereby improving the cycle performance of the battery.

When the OI value r of the negative electrode plate, the porosity s of the negative electrode plate, and the resistivity t of the negative electrode plate satisfied the above formula (1), the capacity retention rate of the lithium-ion secondary battery after 400 charge-discharge cycles at 45° C. and 1 C/1 C was significantly increased. As can be seen, the cycle performance of the lithium-ion secondary battery was obviously improved. Meanwhile, the DC impedance of the lithium-ion secondary battery at 25° C., 50% SOC, 4 C rate constant current discharge for 30 s was low, making the lithium-ion secondary battery have both high kinetic performance and rate performance.

Further, when the positive active material of the lithium-ion secondary battery includes the first positive active material and the second positive active material, the temperature increase of the lithium-ion secondary battery in the thermal shock test was effectively controlled, so that the lithium-ion secondary battery had high safety performance.

According to Examples 1-12, the lithium-ion secondary battery according the embodiments of the present application had both high safety performance and cycle performance, and had low impedance, so that it combined high kinetic performance and rate performance.

The above is only the specific embodiment of the present application, but the scope of the present application is not limited thereto. It will be apparent to those skilled in the art that the present application may be modified and varied in accordance with the above teachings. Such modifications and variations of the present application are intended to be included within the scope of the claims of the present application. Therefore, the scope of the present application should be determined by the scope of the claims.

The invention claimed is:

1. A lithium-ion secondary battery comprising a positive electrode plate, a negative electrode plate, a separator, and an electrolyte, wherein the positive electrode plate comprises a first positive active material represented by chemical formula (1) and a second positive active material represented by chemical formula (2):

   chemical formula (1)

   chemical formula (2)

in the chemical formula (1), $-0.1 \leq x \leq 0.2$, $0<a<1$, $0 \leq a<1$, $0 \leq b<1$, $0<a+b<1$, $0 \leq y<0.2$, M comprises one or more of Mn, Fe, Cr, Ti, Zn, V, Al, Zr and Ce, and A comprises one or more of S, N, F, Cl, Br and I, in the chemical formula (2), $-0.1 \leq z \leq 0.2$, $0<c<2$, $0 \leq d<1$, M' comprises one or more of Ni, Fe, Cr, Ti, Zn, V Al, Mg, Zr and Ce, and A' comprises one or more of S, N, F, Cl, Br, and I;

wherein a mass ratio of the first positive active material to the second positive active material is from 35:65 to 95:5;

wherein the negative electrode plate comprises: a negative electrode current collector and a negative active material layer disposed on at least one surface of the negative electrode current collector, wherein the negative active material layer comprises a graphite material; and wherein a ratio r between diffraction peak intensity of (004) crystal surface and diffraction peak intensity of (110) crystal surface of the negative electrode plate, a porosity s of the negative electrode plate, and a resistivity t of the negative electrode plate satisfy Formula (1):

$$0.05 \leq \frac{100 \times s}{r \times t} \leq 10,$$ Formula (1)

In Formula (1), t has a unit of Ω·m; wherein the negative electrode plate has a resistivity t of 5 Ω·m to 100 Ω·m;

wherein the ratio r between diffraction peak intensity of (004) crystal surface and diffraction peak intensity of (110) crystal surface of the negative electrode plate is from 1 to 50;

wherein the negative electrode plate has a porosity a of 10% to 60%, and/or wherein the negative active material layer has a compact density of 1.5 g/cm$^3$ to 1.75 g/cm$^3$; and wherein the electrolyte contains a manganese ion complexing additive in an amount of 2.1 wt % to 4.0 wt % in the electrolyte.

2. The lithium-ion secondary battery according to claim 1, wherein the electrolyte contains a negative-electrode film-forming additive.

3. The lithium-ion secondary battery according to claim 2, wherein the negative-electrode film-forming additive is present in an amount of 0.1 wt % to 2 wt % in the electrolyte.

4. The lithium-ion secondary battery according to claim 2, wherein the electrolyte further contains a fluorine-containing lithium salt type additive, and wherein the fluorine-containing lithium salt type additive is one or more of lithium difluorophosphate LiPO$_2$F$_2$, lithium difluoro(oxalato)phosphate LiDFOP, lithium tetrafluoroborate LiBF$_4$, and lithium difluoro(oxalato)borate LiDFOB.

5. The lithium-ion secondary battery according to claim 4, wherein the fluorine-containing lithium salt type additive is present in an amount of 0.05 wt % to 1.5 wt % in the electrolyte.

6. The lithium-ion secondary battery according to claim 1, wherein the Mn element in the negative active material layer has a total amount of 1500 ppm or less when the remaining capacity of the lithium-ion secondary battery is 70% or more of nominal capacity.

7. The lithium-ion secondary battery according to claim 1, wherein $0.5 \leq a<1$, $0<b<0.5$, $0.7 \leq a+b<1$, $0 \leq y<0.1$, M is one or both of Mn and Al, and A is one or both of S and F.

8. The lithium-ion secondary battery according to claim 1, wherein the manganese ion complexing additive is a chain nitrile compound.

9. The lithium-ion secondary battery according to claim 1, wherein the manganese ion complexing additive is one or more of adiponitrile, succinonitrile, glutaronitrile and hexane tricarbonitrile.

10. The lithium-ion secondary battery according to claim 2, wherein the negative-electrode film-forming additive is one or more of a cyclic carbonate containing an unsaturated bond, a fluorine-containing cyclic carbonate, a cyclic sulfonate and a cyclic sulfate.

11. The lithium-ion secondary battery according to claim 2, wherein the negative-electrode film-forming additive is one or more of vinylene carbonate, vinyl ethylene carbonate, fluoroethylene carbonate, difluoroethylene carbonate, trifluoromethyl ethylene carbonate, methylene methane disulfonate, 1,3-propane sultone, 1-propene-1,3-sultone, and ethylene sulfate.

* * * * *

UNITED STATES PATENT AND TRADEMARK OFFICE
CERTIFICATE OF CORRECTION

| | |
|---|---|
| PATENT NO. | : 11,355,742 B2 |
| APPLICATION NO. | : 16/679168 |
| DATED | : June 7, 2022 |
| INVENTOR(S) | : Zhiqiang Li and Changlong Han |

It is certified that error appears in the above-identified patent and that said Letters Patent is hereby corrected as shown below:

On the Title Page

(73) Assignee:
Please delete "Contemporary Amperex Technologv Co., Limited" and insert -- Contemporary Amperex Technology Co., Limited -- therefor.

Signed and Sealed this
Nineteenth Day of July, 2022

Katherine Kelly Vidal
*Director of the United States Patent and Trademark Office*